3,303,016
FERTILIZING METALLURGICAL SLAG WITH NITROGEN SALTS FOR AGGLOMERATION AND POWDERING RESISTANCE
Nicholas A. Boukidis, Evanston, Ill., assignor to Dynamic Industrial, Inc.
No Drawing. Filed Oct. 23, 1964, Ser. No. 406,146
2 Claims. (Cl. 71—62)

This application is a continuation-in-part of my copending application Serial No. 12,271, filed March 2, 1960, now abandoned.

This invention relates to additives for amending and enriching soil and to methods of making the same. It particularly relates to a fertilizer composition having unique resistance to powdering, lumping and agglomeration with highly desirable qualities as a carrier for trace elements useful in promoting healthy soil conditions and as a base material for a fertilizer containing all the known nutritional elements for plant feeding, together with unique "non-burning" characteristics not found in conventional fertilizers.

Metallurgical slag, such as blast furnace slags, have in the past been used as liming and fertilizer materials. Certain of these slags have highly desirable properties for soil sweetening and acid neutralizing as well as soil conditioning properties. Blast furnace slags, which are particularly desirable for their liming properties, have the undesirable properties of agglomerating on storage and forming hard relatively large lumps which are difficult to reduce. In this form, unless crushed, slag has relatively little use either as a soil conditioner or as a soil sweetener. To some extent these slags also tend to form a fine powder, particularly after the lumps are reduced in size. Unless watered down, they create undesirable dust effects upon spreading, particularly if there is any wind involved.

Conventional commercial fertilizer compositions (so called NPK compositions) have a similar tendency to "cake" or agglomerate and to form large lumps which are difficult to crush. Such lumps cannot be used in ordinary agricultural machinery and have little usefulness as agricultural fertilizer.

I have discovered unique methods of treating metallurgical slags, such as blast furnace slag and conventional NPK fertilizers, in combination, which eliminates these undesirable properties of agglomeration and powdering. I may at the same time incorporate highly desirable trace minerals into the product to produce a highly useful new product.

I have discovered that metallurgical slags when treated with a mixture of components of ammonia, phosphoric acid and potassium at relatively high levels will not aggregate in storage substantially irrespective of the length of time stored as distinguished from either component alone.

I have discovered a unique method of preparing a complete fertilizer product and soil amending product that contains every known nutritional element needed for plant feeding and for correcting soil acidity. The product contains all three of the groups categorized by agricultural agencies as fertilizers, liming materials and trace elements.

The process of this invention and the fertilizing compositions resulting therefrom can perhaps best be understood by referring to the following examples of certain preferred practices of this invention.

Applicant's following examples describe the use of water-quenched blast furnace slag. Other types of blast furnace slags are equally useful in applicant's treatment and selection of blast furnace slag for the following example is not intended in any way to limit the scope of applicant's invention.

Applicant prefers to use water-quenched slag as opposed to air cooled slag because it eliminates the breaking up or crushing operation necessary with air cooled slag and because it combines better with the ingredients added in applicant's process and also because it breaks down in the soil more readily than does air cooled slag.

Analysis of suitable blast furnace slags for applicant's purposes fall into the following approximate range:

| | Percent |
|---|---|
| Silica ($SiO_2$) | About 33–42 |
| Alumina ($Al_2O_3$) | About 10–16 |
| Lime (CaO) | About 36–45 |
| Magnesia (MgO) | About 3–14 |
| Sulfur (S) | About 1–3 |
| Iron oxide (FeO) | About 0.3–2 |
| Manganese oxide (MnO) | About 0.2–1.5 |

Applicant takes blast furnace slag and screens or otherwise reduces it to a particle size within the standard prescribed by the United States Department of Agriculture for "agricultural ground" grade. The method of reduction to proper particle size is immaterial but for example, slag screened to a mesh size whereby 83% passes through a number 20 United States standard mesh and 31% passes through a number 60 United States standard mesh would meet said "agricultural ground" standard. The above described water-quenched "agricultural ground" slag is an ideal base material for my invention and in the examples references to prepared slag are intended to indicate slag falling within the approximate ranges and standard just described.

In addition to the non-agglomerating and non-powdering characteristics found by applicant upon mixing NPK fertilizer with the prepared slag, it is additionally an excellent vehicle for adding trace elements to the composition.

Of course, it is well known that slag itself contains a certain amount of trace elements and soluble silica as well as other valuable elements and minerals, which ordinary base or filler materials used in fertilizer composition contain in insignificant amounts or lack altogether.

Applicant discovered that using the prepared slag as a base for a fertilizer has the advantage of not only containing significant amounts of said elements and minerals so vital to promoting a healthy soil as well as the acid neutralizing characteristic of the slag itself in minimizing any "burning" effects, but also, the prepared slag is a superior vehicle for the addition of trace minerals otherwise insufficiently present or absent altogether. Applicant has discovered that these trace elements can be added to the prepared slag in liquid form without the necessity of expensive drying operations when mixed with NPK fertilizer and still yields a non-agglomerating, non-powdering fertilizer with good flowing characteristics.

Applicant prepares a trace element solution as follows:
To 150 gallons of water, applicant adds and mixes:

| | Lbs. |
|---|---|
| Copper sulphate (or copper chloride) | 50 |
| Zinc sulphate (or zinc chloride) | 50 |
| Sodium borate | 50 |
| Molybdic oxide | 5 |
| Cobalt salt | 1 |
| Corn starch | 100 |
| Chromate | 50 |

To this mixture applicant adds a few milligrams of fungicide and germicide to inhibit fungus or bacteria growth in the solution.

This yields approximately 165 gallons of solution. Applicant wishes to point out that the corn starch is added because it is a good adhering agent and that the chromate is added to provide green coloring useful because of its appearance and in aiding visibility during application to soil.

The trace element solution is then added to the prepared slag at approximately 1 gallon for every 100 lbs. of slag. Applicant discovered that the slag will absorb the trace element solution without necessitating any drying process which is a costly operation and is one major reason why other fertilizer producers are reluctant to add trace elements to their compositions.

The trace element solution and the prepared slag may be mixed in any suitable manner, such as cement mixer.

In the next step applicant continues mixing and adds the fertilizer components to the slag-trace mixture in substantially the following proportions:

| | Lbs. |
|---|---|
| Slag-trace element mix | 58 |
| Ammonium sulphate | 5 |
| Urea or urea formaldehyde | 13.5 |
| Triple superphosphate | 9 |
| Muriate of potash | 8.5 |
| Vermiculite | 5 |
| Diatomaceous earth | 1 |
| Total | 100 |

The above fertilizer components were selected to yield in the final aggregate a 7–4–5 formula NPK fertilizer which is a particularly well balanced formula for application to most Eastern United States soils as garden fertilizer.

The vermiculite and diatomaceous earth components are added by applicant to assist the flowing characteristics of the material and further aid in completely drying the material.

This final mixture yields a guaranteed minimum analysis registerable with state agricultural agencies as follows:

Nitrogen _____ 7%.
Phosphorous _____ 4%.
Potassium _____ 5%.
Lime _____ 24.2% (as CaO equivalent).
Calcium _____ 12.4% (as CaO equivalent 17.4%).
Magnesium _____ 3.2% (as MgO equivalent 5.3%).
Trace-elements ___ 2.456%.

The trace elements further breaking down as follows:

| | Percent |
|---|---|
| Boron | .05 |
| Manganese | .5 |
| Iron | .25 |
| Zinc | .05 |
| Copper | .05 |
| Sulphur | .75 |
| Chlorine | .75 |
| Sodium | .05 |
| Molybdenum | 0.01 |
| Cobalt | 0.002 |

The above final mixture yields a slag base fertilizer that will not agglomerate or powder, that is readily flowable through a spreader, that minimizes "burning" effects no matter what the season and if spread in reasonable amounts will not burn plant life at all, and finally it is a good soil sweetener and conditioner that contains in ample amounts all the known elements and minerals essential to promoting healthy soil and plant life in one fertilizer product.

As a second example, I may provide a fertilizer material of the 4–12–4 NPK type which is non-agglomerating and non-burning by admixing:

| | Lbs. |
|---|---|
| Slag-trace element mix | 49.5 |
| Ammonium phosphate potash (14–14–14) | 14.3 |
| Triple superphosphate | 21.3 |
| Muriate of potash | 3.4 |
| Urea | 4.5 |
| Vermiculite | 6 |
| Diatomaceous earth | 1 |
| Total | 100 |

Again the final mixture is a good soil sweetener and conditioner which adds ample amounts of known trace element and minerals.

The foregoing specific examples show preferred practices of this invention. However, the proportions of prepared slag to trace element solution and of slag-trace element mix to NPK fertilizer as well as the ratios of the components of the NPK fertilizer and trace element solution in themselves are limited only by the fact that there must be at least 1% by weight of nitrogen containing compound in order to prevent agglomeration of the slag and there must be sufficient slag to meet the fixed percentages of the NPK constituents. The primary considerations in determining proper proportions being the type of soil and the plant life to be grown thereon.

The specific examples represent final mixtures which applicant believes will be useful in perphaps 80% of the United States for most any type of plant life. Applicant wishes to point out, however, that the proportions may be varied as earlier indicated.

The proportion of slag-trace element mix to NPK may vary as low as 35% of the total weight. Applicant has found that below 35% there is not sufficient calcium present to perform the sweetening process needed in most of the gardens in the United States. Obviously, in the alkaline soil of the dryer parts of the country, this is not a problem, but for most garden areas a final mixture containing less than 35% of slag-trace element mix would not be too satisfactory.

On the other hand, the slag-trace element mix could comprise as high as 85% of the total final fertilizer mix, but at this point it becomes more of a liming material than it does a fertilizer. It is obvious that where the soil is acid but otherwise rich in plant food elements, a mixture with higher slag content is desirable. However, for most gardens, applicant believes that the 58% slag-trace example is a happy medium.

The 7–4–5 NPK formulation likewise may be varied almost without limitation, depending primarily on the plant life to be grown.

Obviously if plants requiring more phosphorous are to be grown then the P component should be increased, etc. ad infinitum. However, applicant believes that the 7–4–5 ratio and the 4–12–4 ratio has the widest value to the greatest number of gardens or lawns in the United States and therefore used it in the example.

While I have shown and described certain present preferred embodiments of the invention, it is to be distinctly understood that the invention is not limited thereto but may be otherwise variously embodied within the scope of the following claims.

I claim:

1. An agricultural fertilizer material resistant to agglomeration, powdering and burning of plant life comprising agricultural ground liming metallurgical slag admixed with about 15% to about 20% by weight of potassium, phosphorous and nitrogen as conventional nutrient salts, said salts of nitrogen being present in an amount sufficient to provide at least 1% by weight of nitrogen on the total mix and said slag having a CaO equivalent of about 20% to 25%.

2. An agricultural fertilizer material as claimed in claim 1 wherein the liming metallurgical slag has adsorbed thereon an amount of salts of boron, manganese, iron, zinc, copper, sulfur, chloride, sodium, molybdenum, and cobalt sufficient to provide about 1% to about 3% by weight on the total weight of the admixture.

References Cited by the Examiner

UNITED STATES PATENTS

| | | | |
|---|---|---|---|
| 1,384,990 | 7/1921 | Campbell | 71—62 |
| 2,903,349 | 9/1959 | Bryant | 71—62 |
| 2,904,425 | 9/1959 | Kippe | 71—63 |
| 2,927,851 | 3/1960 | Wilson | 71—62 |

DONALL H. SYLVESTER, *Primary Examiner.*

ANTHONY SCIAMANNA, HOWARD R. CAINE,
*Examiners.*

G. W. RUTHERFORD, *Assistant Examiner.*